(12) United States Patent
Duma et al.

(10) Patent No.: US 12,545,844 B2
(45) Date of Patent: Feb. 10, 2026

(54) HYDROCRACKING CATALYST AND PROCESS USING MOLECULAR SIEVE SSZ-91

(71) Applicant: CHEVRON U.S.A. INC., San Ramon, CA (US)

(72) Inventors: Viorel Duma, Hercules, CA (US); Theodorus Ludovicus Michael Maesen, Spring, TX (US); Hyungjae Alexander Yoon, Richmond, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 81 days.

(21) Appl. No.: 18/261,948

(22) PCT Filed: Jan. 17, 2022

(86) PCT No.: PCT/IB2022/050354
§ 371 (c)(1),
(2) Date: Jul. 18, 2023

(87) PCT Pub. No.: WO2022/153265
PCT Pub. Date: Jul. 21, 2022

(65) Prior Publication Data
US 2024/0084205 A1    Mar. 14, 2024

Related U.S. Application Data

(60) Provisional application No. 63/138,786, filed on Jan. 18, 2021.

(51) Int. Cl.
*C10G 47/20* (2006.01)
*B01J 29/76* (2006.01)
*B01J 29/78* (2006.01)

(52) U.S. Cl.
CPC .......... *C10G 47/20* (2013.01); *B01J 29/7661* (2013.01); *B01J 29/7861* (2013.01); *B01J 2229/16* (2013.01); *B01J 2229/186* (2013.01); *C10G 2300/1007* (2013.01); *C10G 2300/104* (2013.01); *C10G 2300/1051* (2013.01); *C10G 2300/1059* (2013.01); *C10G 2300/1074* (2013.01); *C10G 2300/302* (2013.01); *C10G 2300/304* (2013.01)

(58) Field of Classification Search
CPC ............ C10G 47/20; C10G 2300/1007; C10G 2300/104; C10G 2300/1051; C10G 2300/1059; C10G 2300/1074; C10G 2300/302; C10G 2300/304; C10G 2400/04; C10G 47/16; C10G 47/18; B01J 29/7661; B01J 29/7861; B01J 2229/16; B01J 2229/186; B01J 29/7261; B01J 37/0201; B01J 37/0236; B01J 37/082
See application file for complete search history.

(56) References Cited

U.S. PATENT DOCUMENTS

| | | | |
|---|---|---|---|
| 4,910,006 A * | 3/1990 | Zones | C07C 6/126 502/64 |
| 9,200,218 B2 | 12/2015 | Dougherty et al. | |
| 2015/0159095 A1* | 6/2015 | Zhan | B01J 29/166 208/95 |
| 2017/0058209 A1* | 3/2017 | Ojo | C10G 45/64 |
| 2020/0299142 A1 | 9/2020 | Ojo et al. | |

FOREIGN PATENT DOCUMENTS

| CN | 108137332 A | 6/2018 |
|---|---|---|
| CN | 107344109 B | 9/2019 |

OTHER PUBLICATIONS

International Search Report, issued on Apr. 7, 2022, during the prosecution of International Application No. PCT/IB2022/050354.
Written Opinion of the International Searching Authority, issued on Apr. 7, 2022, during the prosecution of International Application No. PCT/IB2022/050354.
"Manual for Oil Refining Engineers." Edited by Hou Fusheng, Petroleum Industry Press, Oct. 1995, pp. 195-206.
"Petroleum Refining Technology." vol. II, edited by Zhu Yunqing, China Petrochemical Publishing House, May 1992, pp. 155-159.

* cited by examiner

*Primary Examiner* — Prem C Singh
*Assistant Examiner* — Juan C Valencia
(74) *Attorney, Agent, or Firm* — Mark Warzel

(57) ABSTRACT

Described herein is a hydrocracking catalyst and process that may be used to make middle distillates and unconverted oil having beneficial yield and product characteristics. The process generally comprises contacting a hydrocarbon feed with the hydrocracking catalyst under hydrocracking conditions to produce a product comprising middle distillates and unconverted oil products. The hydrocracking catalyst comprises an SSZ-91 molecular sieve and a modifying metal selected from one or more Group 6 metals, and, optionally, one or more Group 8 to 10 metals, or a modifying metal selected from Group 8 to 10 metals and combinations thereof, and, optionally, one or more Group 6 metals. The hydrocracking catalyst may comprise a matrix material and/or an additional zeolite.

9 Claims, No Drawings

HYDROCRACKING CATALYST AND PROCESS USING MOLECULAR SIEVE SSZ-91

CROSS REFERENCE TO RELATED APPLICATIONS

This application is related to the following applications, and claims the benefit of priority thereto, as a 371 application of PCT/IB2022/050354, filed on Jan. 17, 2022, which is the international application based on U.S. Provisional Appl. Ser. No. 63/138,786, filed on Jan. 18, 2021, the disclosures of which are herein incorporated in their entirety.

TECHNICAL FIELD

Described herein is a hydrocracking catalyst based on molecular sieve SSZ-91 and a hydroprocessing method using the catalyst to produce middle distillates.

BACKGROUND

Hydrocracking of hydrocarbon feedstocks is often used to convert lower value hydrocarbon fractions into higher value products, such as in the conversion of vacuum gas oil (VGO) feedstocks to various fuels and lubricants. Typical hydrocracking reaction schemes can include an initial hydrotreatment step, a hydrocracking step, and a post-hydrotreatment step, such as dewaxing or hydrofinishing. Additional steps may be used as well, with the effluent fractionated to separate out a desired product, such as a diesel fuel and/or lube base oil products.

Vacuum gas oil is widely used for the production of liquid fuels by hydrocracking over fixed bed catalysts. Middle distillate product fractions having a low cloud and pour point are particularly beneficial. It is also advantageous to provide unconverted oil (UCO) from hydrocracking having a low pour point and high viscosity index (VI). Often the middle distillate and the UCO are subjected to additional processing steps in order to achieve these objectives. Further processing steps, including higher levels of hydrocracking, may, however, lead to decreased yields of desired products, such as middle distillates. A catalyst and process that accomplishes these goals in the hydrocracking step, without the necessity for additional processing steps, can provide significant economic advantage Accordingly, there is a need for catalysts and hydroprocessing methods providing a lower degree of hydrocracking and which provide increased yields of middle distillates, such as diesel fuel.

SUMMARY

Described herein is a hydrocracking catalyst and process that may be used to make middle distillates and unconverted oil having beneficial yield and product characteristics. The process generally comprises contacting a hydrocarbon feed with the hydrocracking catalyst under hydrocracking conditions to produce a product comprising middle distillates and unconverted oil products. The hydrocracking catalyst comprises an SSZ-91 molecular sieve and a modifying metal selected from one or more Group 6 metals, and, optionally, one or more Group 8 to 10 metals, or a modifying metal selected from Group 8 to 10 metals and combinations thereof, and, optionally, one or more Group 6 metals. The hydrocracking catalyst may comprise a matrix material and/or an additional zeolite.

DETAILED DESCRIPTION

Although illustrative embodiments of one or more aspects are provided herein, the disclosed processes may be implemented using any number of techniques. The disclosure is not limited to the illustrative or specific embodiments, drawings, and techniques illustrated herein, including any exemplary designs and embodiments illustrated and described herein, and may be modified within the scope of the appended claims along with their full scope of equivalents.

Unless otherwise indicated, the following terms, terminology, and definitions are applicable to this disclosure. If a term is used in this disclosure but is not specifically defined herein, the definition from the IUPAC Compendium of Chemical Terminology, 2nd ed (1997), may be applied, provided that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein is to be understood to apply.

"API gravity" refers to the gravity of a petroleum feedstock or product relative to water, as determined by ASTM D4052-11.

"Viscosity index" (VI) represents the temperature dependency of a lubricant, as determined by ASTM D2270-10 (E2011).

"Vacuum gas oil" (VGO) is a byproduct of crude oil vacuum distillation that can be sent to a hydroprocessing unit or to an aromatic extraction for upgrading into base oils. VGO generally comprises hydrocarbons with a boiling range distribution between 343° C. (649° F.) and 593° C. (1100° F.) at 0.101 MPa.

"Treatment," "treated," "upgrade," "upgrading" and "upgraded," when used in conjunction with an oil feedstock, describes a feedstock that is being or has been subjected to hydroprocessing, or a resulting material or crude product, having a reduction in the molecular weight of the feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

"Hydrocarbon" refers to any compound which comprises hydrogen and carbon and "hydrocarbon feedstock" refers to any charge stock which contains greater than about 90 wt. % carbon and hydrogen.

"Hydroprocessing" refers to a process in which a carbonaceous feedstock is brought into contact with hydrogen and a catalyst, at a higher temperature and pressure, for the purpose of removing undesirable impurities and/or converting the feedstock to a desired product. Examples of hydroprocessing processes include hydrocracking, hydrotreating, catalytic dewaxing, and hydrofinishing.

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins (naphthenes) into non-cyclic branched paraffins.

"Hydrotreating" refers to a process that converts sulfur and/or nitrogen-containing hydrocarbon feeds into hydrocarbon products with reduced sulfur and/or nitrogen content, typically in conjunction with hydrocracking, and which generates hydrogen sulfide and/or ammonia (respectively)

as byproducts. Such processes or steps performed in the presence of hydrogen include hydrodesulfurization, hydrodenitrogenation, hydrodemetallation, and/or hydrodearomatization of components (e.g., impurities) of a hydrocarbon feedstock, and/or for the hydrogenation of unsaturated compounds in the feedstock. Depending on the type of hydrotreating and the reaction conditions, products of hydrotreating processes may have improved viscosities, viscosity indices, saturates content, low temperature properties, volatilities and depolarization, for example. The terms "guard layer" and "guard bed" may be used herein synonymously and interchangeably to refer to a hydrotreating catalyst or hydrotreating catalyst layer. The guard layer may be a component of a catalyst system for hydrocarbon dewaxing, and may be disposed upstream from at least one hydroisomerization catalyst.

"Distillate" means that typical fuels of this type can be generated from vapor overhead streams from distilling petroleum crude. In contrast, residual fuels cannot be generated from vapor overhead streams by distilling petroleum crude, and are then non-vaporizable remaining portion. Within the broad category of distillate fuels are specific fuels that include: naphtha, jet fuel, diesel fuel, kerosene, aviation gas, fuel oil, and blends thereof. at a specified temperature. The term "middle distillate" refers to products boiling in the 250-700° F. (121-371° C.) range, including diesel fuel. Middle distillates can include jet, kerosene, and diesel. Some typical naphthas and middle distillates for the North American market include the following:

TABLE 1

| Products | Typical Cut Points ° F. (° C.) |
|---|---|
| Light Naphtha | $C_5$-180 ($C_5$-82) |
| Heavy Naphtha | 180-300 (82-149) |
| Jet | 300-380 (149-193) |
| Kerosene | 380-530 (193-277) |
| Diesel | 530-700 (277-371) |

"TBP" refers to the boiling point of a hydrocarbonaceous feed or product, as determined by Simulated Distillation (SimDist) by ASTM D2887-13.

"Hydrocarbonaceous", "hydrocarbon" and similar terms refer to a compound containing only carbon and hydrogen atoms. Other identifiers may be used to indicate the presence of particular groups, if any, in the hydrocarbon (e.g., halogenated hydrocarbon indicates the presence of one or more halogen atoms replacing an equivalent number of hydrogen atoms in the hydrocarbon).

The term "Periodic Table" refers to the version of the IUPAC Periodic Table of the Elements dated Jun. 22, 2007, and the numbering scheme for the Periodic Table Groups is as described in Chem. Eng. News, 63(5), 26-27 (1985). "Group 2" refers to IUPAC Group 2 elements, e.g., magnesium, (Mg), Calcium (Ca), Strontium (Sr), Barium (Ba) and combinations thereof in any of elemental, compound, or ionic form. "Group 7" refers to IUPAC Group 7 elements, e.g., manganese (Mn), rhenium (Re) and combinations thereof in their elemental, compound, or ionic form. "Group 8" refers to IUPAC Group 8 elements, e.g., iron (Fe), ruthenium (Ru), osmium (Os) and combinations thereof in their elemental, compound, or ionic form. "Group 9" refers to IUPAC Group 9 elements, e.g., cobalt (Co), rhodium (Rh), iridium (Ir) and combinations thereof in any of elemental, compound, or ionic form. "Group 10" refers to IUPAC Group 10 elements, e.g., nickel (Ni), palladium (Pd), platinum (Pt) and combinations thereof in any of elemental, compound, or ionic form. "Group 14" refers to IUPAC Group 14 elements, e.g., germanium (Ge), tin (Sn), lead (Pb) and combinations thereof in any of elemental, compound, or ionic form.

The term "support", particularly as used in the term "catalyst support", refers to conventional materials that are typically a solid with a high surface area, to which catalyst materials are affixed. Support materials may be inert or participate in the catalytic reactions, and may be porous or non-porous. Typical catalyst supports include various kinds of carbon, alumina, silica, and silica-alumina, e.g., amorphous silica aluminates, zeolites, alumina-boria, silica-alumina-magnesia, silica-alumina-titania and materials obtained by adding other zeolites and other complex oxides thereto.

The term "molecular sieve" and "zeolite" are synonymous and include (a) intermediate and (b) final or target molecular sieves and molecular sieves produced by (1) direct synthesis or (2) post-crystallization treatment (secondary modification). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433 to C. Y. Chen and Stacey Zones, issued Sep. 14, 2004. at a specified temperature The term "*MRE-type molecular sieve" and "EUO-type molecular sieve" includes all molecular sieves and their isotypes that have been assigned the International Zeolite Association framework, as described in the *Atlas of Zeolite Framework Types*, eds. Ch. Baerlocher, L. B. McCusker and D. H. Olson, Elsevier, 6$^{th}$ revised edition, 2007 and the Database of Zeolite Structures on the International Zeolite Association's website (http://www.iza-online.org).

Properties of the materials described herein are determined as follows:

"Cut point" refers to the temperature on a True Boiling Point (TBP) curve at which a predetermined degree of separation is reached.

"Pour point" refers to the temperature at which an oil will begin to flow under controlled conditions. The pour point may be determined by, for example, ASTM D5950.

"Cloud point" refers to the temperature at which a lube base oil sample begins to develop a haze as the oil is cooled under specified conditions. The cloud point of a lube base oil is complementary to its pour point. Cloud point may be determined by, for example, ASTM D5773.

"Viscosity index" (VI) is an empirical, unit-less number indicated the effect of temperature change on the kinematic viscosity of the oil. The higher the VI of a base oil, the lower its tendency to change viscosity with temperature. VI is determined according to ASTM D2270.

"Kinematic viscosity" at a specified temperature is determined according to ASTM D445.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof. In addition, all number ranges presented herein are inclusive of their upper and lower limit values.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

In one aspect, the present invention is a hydrocracking catalyst and process that may be used to make middle distillates and unconverted oil having beneficial yield and product characteristics. The hydrocracking catalyst comprises an SSZ-91 molecular sieve and a modifying metal selected from one or more Group 6 metals, and, optionally, one or more Group 8 to 10 metals, or a modifying metal selected from Group 8 to 10 metals and combinations thereof, and, optionally, one or more Group 6 metals. The hydrocracking catalyst may comprise a matrix material and/or an additional zeolite. The process comprises contacting a hydrocarbon feed with the hydrocracking catalyst under hydrocracking conditions to produce a product comprising middle distillates and unconverted oil products.

The SSZ-91 molecular sieve used in the hydrocracking catalyst is described in, e.g., U.S. Pat. Nos. 9,802,830; 9,920,260; 10,618,816; and in WO2017/034823. The SSZ-91 molecular sieve generally comprises ZSM-48 type zeolite material, the molecular sieve having at least 70% polytype 6 of the total ZSM-48-type material; an EUO-type phase in an amount of between 0 and 3.5 percent by weight; and polycrystalline aggregate morphology comprising crystallites having an average aspect ratio of between 1 and 8. The silicon oxide to aluminum oxide mole ratio of the SSZ-91 molecular sieve may be in the range of 40 to 220 or 50 to 220 or 40 to 200. The foregoing noted patents provide additional details concerning SSZ 91 sieves, methods for their preparation, and catalysts formed therefrom.

While not limited thereto, in more particular aspects, the Group 8 to 10 metal comprises Ni, Co, or a combination thereof. The Group 6 metal may also be more particularly specified to comprise Mo, W, or a combination thereof. As such, in some embodiments, the hydrocracking catalyst may comprise a Group 8 to 10 metal selected from Ni, Co, or a combination thereof, a Group 6 metal selected from Mo, W, or a combination thereof. In some aspects, the SSZ-91 molecular sieve comprises both a Group 8 to 10 metal and a Group 6 metal. That is, in some more particular embodiments, the hydrocracking catalyst may also comprise a Group 8 to 10 metal selected from Ni, Co, or a combination thereof, and a Group 6 metal selected from Mo, W, or a combination thereof. The molecular sieve may exclude a noble metal, or may comprise only one or more of the foregoing non-noble metals.

The hydrocracking catalyst may also comprise additional components, including matrix materials, also referred to as supports, zeolites, promoters, and the like. Suitable matrix materials generally include silica, alumina, amorphous silica-alumina (ASA), ceria, titania, magnesia, thoria, zirconia, or a combination thereof. In more particular aspects, the matrix material may be selected from alumina, amorphous silica-alumina (ASA), or a combination thereof. Other examples of the support materials include alumina-boria, silica-alumina-magnesia, silica-alumina-titania and materials obtained by adding zeolites and other complex oxides thereto. In some cases, the support material may be porous, and comprise a natural clay or a synthetic oxide. The support material can also be selected to provide adequate mechanical strength and chemical stability at the reaction conditions under which the hydrocracking catalyst is used. In some cases, the support material may comprise a pseudo-boehmite alumina, such as CATAPAL® high purity aluminas (CATAPAL® is a registered trademark of SASOL), while suitable amorphous silica-aluminas include SIRAL® (SIRAL® is a registered trademark of SASOL).

Additional zeolites may also be included in the hydrocracking catalyst, including, e.g., Y, USY, beta zeolites, and any combination thereof. Promoters such as silicon, boron, phosphorus, fluorine, aluminum, zinc, manganese, or a combination thereof may be included in the catalyst as well. The amount of promoter in the hydrocracking catalyst can be from 0 wt. % to 10 wt. % based on the bulk dry weight of the hydrocracking catalyst. In some cases, the amount of promoter in the hydrocracking catalyst may be from 0.1 wt. % to 5 wt. % based on the bulk dry weight of the hydrocracking catalyst.

While not limited thereto, the hydrocracking catalyst may comprise about 0.1 to 60 wt. % of the modifying metal, 1 to 99 wt. % of the matrix material, 0.1 to 99 wt. % of the ZSM-type zeolite material, and 0.1 to 99 wt. % of the zeolite selected from Y, USY, beta, or a combination thereof. In more particular cases, the hydrocracking catalyst may comprise about 0.1 to 10 wt. % of the modifying metal, 1 to 60 wt. % of the matrix material, 0.1 to 30 wt. % of the ZSM-type zeolite material, and 0.1 to 10 wt. % of the zeolite selected from Y, USY, beta, or a combination thereof.

The hydrocracking catalyst is generally in the form of extruded pellets (extrudates) that have an extruded pellet diameter of 10 mm or less, such as from 1.0 to 5.0 mm. In some cases, the extruded pellet may have a length-to-diameter ratio of 10 to 1. Examples of other types and sizes of pellets used for the hydrocracking catalysts are 1 to 10 mm diameter spheres; 1 to 10 mm diameter cylinders with a length-to-diameter ratio of 4 to 1; 1 to 10 mm asymmetric shapes (including quadrolobes), and up to 10 mm diameter hollow cylinders or rings.

While not particularly limited to a specific method of manufacture, the hydrocracking catalyst may be suitably made using extrusion/impregnation/calcination procedures. For example, the hydrocracking catalyst may be made by mixing together SSZ-91 molecular sieve along with any added matrix (support) material(s) and enough liquid to form an extrudable paste; extruding the paste to form an extrudate base; impregnating the extrudate base with a metal impregnation solution containing a modifying metal selected from one or more Group 6 metals, and, optionally, one or more Group 8 to 10 metals, or a modifying metal selected from Group 8 to 10 metals and combinations thereof, and, optionally, one or more Group 6 metals, to form a metal loaded extrudate; and subjecting the metal loaded extrudate to drying and calcination post-treatment conditions.

The liquid used to form the extrudable paste is typically water or a mild acid. In some cases, the liquid used in may be a diluted $HNO_3$ acid aqueous solution with from 0.5 to 5 wt % $HNO_3$. Prior to the impregnation, the extrudate base is typically dried at a temperature between 90° C. (194° F.) and 150° C. (302° F.) for 30 minutes to 3 hours. The dried extrudate base may then be calcined at one or more temperatures, typically between 350° C. (662° F.) and 700° C. (1292° F.). In some cases, the metal impregnation solution is made by dissolving metal precursors in a solvent. Suitable solvents include water, $C_1$-$C_3$ alcohols, ethers, and amines; e.g., the solvent may be deionized water. The metal impregnation solution may be pH adjusted to a basic pH, such as a basic pH greater than 8, more particularly a basic pH from 9.2 to 9.5. The concentration of the metal impregnation solution can be determined by the pore volume of the support and by the selected metal loading. In some cases, the extrudate base is exposed to the metal impregnation solution for 0.1 to 24 hours. If the hydrocracking catalyst comprises two or more metals, these metals can be added to the base extrudate by the sequential or simultaneous use of single or mixed metal impregnation solutions.

The metal-loaded extrudate is typically dried at one or more temperatures in the range of 38° C. (100° F.) to 177° C. (350° F.) for 0.1 to 10 hours. The dried metal-loaded extrudate can be further calcined at one or more temperatures from 316° C. (600° F.) to 649° C. (1200° F.), usually with an excess dry air purge, for 0.1 to 10 hours.

The hydrocracking catalyst can be used to hydrocrack a broad variety of hydrocarbonaceous feedstocks. Suitable hydrocarbon feeds generally include those suitable for middle distillate production, including, e.g., feeds comprising gasoline, kerosene, gas oils, vacuum gas oils, long residues, vacuum residues, atmospheric distillates, heavy fuels, oils, waxes and paraffins, used oils, deasphalted residues or crudes, charges resulting from thermal or catalytic conversion processes, or a combination thereof. Typical physical properties for useful hydrocarbon feedstocks are shown in Table 2.

TABLE 2

| Property | Value Range |
| --- | --- |
| API Gravity | 10-35.0 |
| N, ppm | 0.5-2,000 |
| S, ppm | 0-100 |
| Polycyclic Index (PCI) | 10-2000 |
| TBP Range, ° F. (° C.) | 700-1200° F. (371-649° C.) |

Typical hydrocracking process conditions are shown in Table 3.

TABLE 3

| Process Condition | Value Range |
| --- | --- |
| Liquid Hourly Space Velocity (LHSV), $hr^{-1}$ | 0.1-5 |
| $H_2$ partial pressure, psig (kPa) | 800-3,500 (5516-24,132) |
| $H_2$ Consumption Rate, SCF/B | 200-20,000 |
| $H_2$ Recirculation Rate, SCF/B | 50-5,000 |
| Operating Temperature, ° F. (° C.) | 392-842° F. (200-450° C.) |
| Conversion (wt. %) | 20-80 |

Depending on the feedstock, target product slate, and amount of available hydrogen, the hydrocracking catalyst may be used alone or in combination with other hydrocracking catalysts. In some cases, the hydrocracking catalyst is deployed in one or more fixed beds in a single stage hydrocracking unit, with or without recycle (once-through operation). Such a single-stage hydrocracking unit may employ multiple single-stage units operated in parallel. In other cases, the catalyst may be deployed in one or more beds or units in a two-stage hydrocracking unit, with and/or without intermediate stage separation, and with or without recycle. Two-stage hydrocracking units may be operated using a full conversion configuration (meaning all of the hydrotreating and hydrocracking is accomplished within the hydrocracking loop via recycle). One or more distillation units may also be used within the hydrocracking loop to strip off product prior to second stage hydrocracking or prior to recycle of the distillation bottoms back to the first and/or second stage.

Two stage hydrocracking units can also be operated in a partial conversion configuration, such that one or more distillation units may be positioned within a hydrocracking loop to strip off one or more streams that are then passed on for further hydroprocessing. Operation of the hydrocracking unit in this manner allows highly disadvantaged feedstocks to be hydroprocessed by allowing undesirable feed components such as the polynuclear aromatics, nitrogen and sulfur species to pass out of the hydrocracking loop for further processing under more suitable conditions.

A number of benefits are provided by the hydrocracking catalyst and process, including advantageous or improved yield of middle distillates, particularly for diesel and UCO products. For example, in some cases, e.g., the middle distillate yield in the 380-700° F. range may be greater than about 55 wt. %, or 58 wt. %, or 60 wt. %, or 62 wt. %. The middle distillate product, such as diesel fuel, may also have a lower cloud point and pour point as compared with a diesel product produced using a hydrocracking catalyst that does not include an SSZ-91 molecular sieve. In particular, the diesel fuel product may have one or more of the following characteristics (as compared with a diesel product produced using a hydrocracking catalyst that does not include an SSZ-91 molecular sieve): a cloud point that is lower by at least about 5° C., or 10° C., or 15° C., or 20° C.; a cloud point is less than about −25° C., or −30° C., or −40° C.; a pour point that is lower by at least about 2° C., or 4° C., or 6° C.; a pour point that is less than about −10° C., or −30° C., or −40° C., or −50° C., or −60° C.

The unconverted oil product may also be provided with advantageous properties due to the use of a hydrocracking catalyst that comprises SSZ-91 molecular sieve. For example, the unconverted oil product may comprise or be an unconverted oil having a lower viscosity index and/or a lower viscosity as compared with an unconverted oil product produced using a hydrocracking catalyst that does not include an SSZ-91 molecular sieve. The UCO product may also have a lower cloud point and pour point as compared with a UCO product produced using a hydrocracking catalyst that does not include an SSZ-91 molecular sieve. More specifically, the UCO product may have one or more of the following characteristics (as compared with a UCO product produced using a hydrocracking catalyst that does not include an SSZ-91 molecular sieve): a pour point that is lower by at least about 5° C., or 10° C., or 15° C., or 20° C., or 25° C.; a pour point that is less than about −35° C., or −40° C., or −45° C., or −50° C., or −55° C.; a viscosity index that is in the range of about 110 to 120; a viscosity at 100°

C. that is lower by at least about 0.1, or 0.2 cSt; a viscosity at 100° C. that is in the range of about 4.4 to 4.6 cSt; a viscosity at 70° C. that is lower by at least about 0.1, or 0.2 cSt; a viscosity at 70° C. that is in the range of about 8.6 to 8.8 cSt.

EXAMPLES

Example 1—Hydrocracking Catalyst Preparation

Hydrocracking catalysts A and B were prepared as base case (comparative) catalysts and hydrocracking catalysts C, D, E, and F were prepared according to the invention. Base case catalysts A and B did not include an SSZ-91 molecular sieve, whereas inventive catalysts B to F included SSZ-91.

Each of catalysts A to F was composited with a matrix support composition of 25 wt. % alumina (CATAPAL® B from Sasol), between 0 to 20 wt. % zeolite, and the balance amorphous silica-alumina (ASA; SIRAL®-40 from Sasol). The mixture was mixed, extruded, dried, and calcined. The dried and calcined extrudate was impregnated with a solution containing active metals and the impregnated catalyst was then dried and calcined. Each catalyst A to F contained Ni and W as the active metals. Base catalyst A contained alumina and amorphous silica-alumina in the support composition. Base catalyst B contained alumina, amorphous silica-alumina and zeolite Y in the support composition. The Y zeolite in the composition of catalyst B was the commercial material HSZ-387 from Tosoh. The Y zeolite in the composition of the catalyst F was the commercial material CBV 760 from Zeolyst. The beta zeolite in the composition of catalysts D and E was a commercial material from Clariant. The SSZ-91 zeolite in the composition of the catalysts C to F is as described and prepared according to U.S. Pat. Nos. 9,802,830; 9,920,260; and 10,618,816.

The zeolite content of catalysts A to F are summarized in Table 4.

TABLE 4

| Catalyst | Total Zeolite wt. % in base | Zeolite wt. % in base | | |
|---|---|---|---|---|
| | | SSZ-91 | Y | Beta |
| A | 0 | 0 | 0 | 0 |
| B | 8 | 0 | 8 | 0 |
| C | 20 | 20.0 | 0 | 0 |
| D | 2.3 | 2.0 | 0 | 0.3 |
| E | 1.5 | 1.0 | 0 | 0.5 |
| F | 0.8 | 0.5 | 0.3 | 0 |

Example 1—Catalyst Performance

Hydrocracking catalysts A to F were tested in a simulated second stage of a Two Stage with Recycle (TSREC) system. The second stage operation was simulated with a Pilot Plant operating in a Single Stage with Recycle (SSRec) mode. The fresh feed to the unit was the Unconverted Oil (UCO) made in the first stage of a commercial hydrocracking (HCR) unit at a conversion lower than 40%.

The first-stage UCO from the HCR was combined with second-stage UCO made in Pilot Plant and fed to the reactor loaded with test catalyst (i.e., one of catalysts A to F). The separation section recovered gases, naphtha and MD and returned second-stage UCO to the feed section. In each test, the unit was operated at a few conversion levels in diesel mode (RCP=700° F.) and at 60% conversion in jet mode (RCP=550° F.). The process conditions in the test were: 2300 PSIG total pressure (approx. 2100 PSIA $H_2$ average); 5000 SCFB $H_2$/oil ratio; and 1.5 LHSV ($hr^{-1}$). The properties of the first-stage UCO from the HCR unit are shown in Table 5.

TABLE 5

| Property | Value |
|---|---|
| API Gravity | 31 |
| Sulfur, ppm wt. | 20 |
| Nitrogen, ppm wt. | 1 |
| PCI | 150 |
| Pour point, ° C. | 41 |
| Cloud point, ° C. | >42 |
| Wax, wt. % | 14.5 |
| Viscosity Index, VI | 118 |
| Viscosity at 70° C., cSt | 11.9 |
| Viscosity at 100° C., cSt | 5.816 |
| Components (by 22×22 GC-MS method) | |
| Paraffins, LVol. % | 22.4 |
| Naphthenes, LVol. % | 64.5 |
| Aromatics, LVol. % | 13.1 |
| Simdist, wt. %-° F. | |
| 0.5/5 | 465/525 |
| 10/30 | 685/767 |
| 50/ | 822 |
| 70/90 | 884/973 |
| 95/99.5 | 1008/1080 |

Pour point and viscosity properties for the feed are shown in Table 6.

TABLE 6

| Property | Value |
|---|---|
| Feed Pour Point, ° C. | 41 |
| Feed Viscosity Index, VI | 118 |
| Feed Viscosity at 100° C. | 5.82 |
| Feed Viscosity at 70° C. | 11.9 |

Properties of the diesel product (product fraction in the boiling range 300-700° F.) and the UCO product (product fraction boiling at 700° F.+) made from the above feed by hydrocracking over each of catalysts A to F at a conversion level of about 60% are shown in Table 7.

TABLE 7

| Product Property | Catalyst | | | | | |
|---|---|---|---|---|---|---|
| | A | B | C | D | E | F |
| Diesel pour point, ° C. | −56 | −51 | <−60 | −57 | <−60 | −54 |
| Diesel cloud point, ° C. | −25 | −23 | <−60 | −44 | −47 | −39 |
| UCO pour point, ° C. | 19 | 32 | <−60 | −37 | −42 | −10 |
| UCO Viscosity Index, VI | 133 | 134 | 115 | 112 | 109 | 119 |
| UCO viscosity at 100° C., cSt | 4.44 | 4.72 | 4.50 | 4.51 | 4.60 | 4.45 |
| UCO viscosity at 70° C., cSt | 8.35 | 9.00 | 8.69 | 8.77 | 8.92 | 8.62 |

As may be noted, catalysts C to F (which contain zeolite SSZ-91) provide diesel and UCO products with considerably lower pour and cloud points compared to the base case catalysts A and B that do not contain zeolite SSZ-91. Also, the viscosity of the UCO is lower in case of catalysts C to F compared to base case catalyst B that only contains the Y zeolite.

In many instances, it is desirable to maximize the yield to mid-distillate (the product fraction within the boiling range 380-700° F.) that is produced at a certain conversion level. Table 8 provides the mid-distillate yield values that are obtained at a conversion level of 60% as described above.

TABLE 8

| Product Property | Catalyst | | | | | |
|---|---|---|---|---|---|---|
| | A | B | C | D | E | F |
| Mid-distillate yield, wt. % of 700° F.-product | −56 | −51 | <−60 | −57 | <−60 | −54 |

As may be noted, catalysts C to F (which contain zeolite SSZ-91) provide an improved mid-distillate yield (Table 8) in addition to providing improved diesel cloud and pour points (Table 7).

The foregoing description of one or more embodiments of the invention is primarily for illustrative purposes, it being recognized that variations might be used which would still incorporate the essence of the invention. Reference should be made to the following claims in determining the scope of the invention.

For the purposes of U.S. patent practice, and in other patent offices where permitted, all patents and publications cited in the foregoing description of the invention are incorporated herein by reference to the extent that any information contained therein is consistent with and/or supplements the foregoing disclosure.

What is claimed is:

1. A hydrocracking process for making middle distillate product and unconverted oil, comprising
   contacting a hydrocarbon feed with a hydrocracking catalyst under hydrocracking conditions to produce a product comprising middle distillates and unconverted oil; wherein, the hydrocracking catalyst comprises an SSZ-91 molecular sieve, one or more Group 6 metals selected from Mo, W, or a combination thereof, and one or more Group 8 to 10 metals selected from Ni, Co, or a combination thereof; wherein,
   the hydrocracking catalyst excludes noble metal;
   the middle distillate product comprises diesel fuel having a lower cloud and pour point as compared with a diesel product produced using a hydrocracking catalyst that does not include an SSZ-91 molecular sieve;
   the middle distillate yield in the 380-700° F. range is at least about 55 wt. %; and,
   the unconverted oil product comprises unconverted oil having a lower viscosity index and/or a lower viscosity as compared with an unconverted oil product produced using a hydrocracking catalyst that does not include an SSZ-91 molecular sieve.

2. The process of claim 1, wherein the silicon oxide to aluminum oxide mole ratio of the SSZ-91 molecular sieve is in the range of 40 to 220 or 50 to 220 or 40 to 200.

3. The process of claim 1, further comprising a matrix material selected from alumina, amorphous silica-alumina (ASA), or a combination thereof.

4. The process of claim 1, further comprising a zeolite selected from Y, USY, beta, or a combination thereof.

5. The process of claim 1, wherein the catalyst further comprises a promoter selected from silicon, boron, phosphorus, or a combination thereof.

6. The process of claim 1, wherein the hydrocarbon feed comprises gasoline, kerosene, gas oils, vacuum gas oils, long residues, vacuum residues, atmospheric distillates, heavy fuels, oils, waxes and paraffins, used oils, deasphalted residues or crudes, charges resulting from thermal or catalytic conversion processes, or a combination thereof.

7. The process of claim 1, wherein the middle distillate yield in the 380-700° F. range is at least about 55, 58, or 60, or 62 wt. %.

8. The process of claim 1, wherein the diesel fuel product has one or more of the following characteristics:
   the cloud point is lower by at least about 5° C., or 10° C., or 15° C., or 20° C.;
   the cloud point is less than about −25° C., or −30° C., or −40° C.;
   the pour point is lower by at least about 2° C., or 4° C., or 6° C.;
   the pour point is less than about −10° C., or −30° C., or −40° C., or −50° C., or −60° C.

9. The process of claim 1, wherein the unconverted oil product has one or more of the following characteristics:
   the pour point is lower by at least about 5° C., or 10° C., or 15° C., or 20° C., or 25° C.;
   the pour point is less than about −35° C., or −40° C., or −45° C., or −50° C., or −55° C.;
   the viscosity index is in the range of about 110 to 120;
   the viscosity at 100° C. is lower by at least about 0.1, or 0.2 cSt;
   the viscosity at 100° C. is in the range of about 4.4 to 4.6 cSt;
   the viscosity at 70° C. is lower by at least about 0.1, or 0.2 cSt;
   the viscosity at 70° C. is in the range of about 8.6 to 8.8 cSt.

* * * * *